(12) United States Patent
Hong

(10) Patent No.: US 12,483,934 B2
(45) Date of Patent: Nov. 25, 2025

(54) METHOD FOR GENERATING EMM TRANSPORT MESSAGE

(71) Applicant: H3NITY Co., Ltd., Yongin-si (KR)

(72) Inventor: Hyo Jin Hong, Seoul (KR)

(73) Assignee: H3NITY Co., Ltd., Yongin-si (KR)

( * ) Notice: Subject to any disclaimer, the term of this patent is extended or adjusted under 35 U.S.C. 154(b) by 0 days.

(21) Appl. No.: 19/279,469

(22) Filed: Jul. 24, 2025

(65) Prior Publication Data

US 2025/0351001 A1 Nov. 13, 2025

(30) Foreign Application Priority Data

Jun. 5, 2025 (KR) .......................... 10-2025-0073959
Jul. 15, 2025 (KR) .......................... 10-2025-0095140

(51) Int. Cl.
*H04W 28/06* (2009.01)
*H04W 4/14* (2009.01)
*H04W 12/10* (2021.01)
*H04W 74/0833* (2024.01)

(52) U.S. Cl.
CPC .............. *H04W 28/06* (2013.01); *H04W 4/14* (2013.01); *H04W 12/10* (2013.01); *H04W 74/0833* (2013.01)

(58) Field of Classification Search
CPC ....... H04W 28/06; H04W 4/14; H04W 12/10; H04W 74/0833
See application file for complete search history.

(56) References Cited

U.S. PATENT DOCUMENTS

| | | | |
|---|---|---|---|
| 2014/0016614 A1* | 1/2014 | Velev | H04W 76/10 370/331 |
| 2019/0053034 A1* | 2/2019 | Kim | H04W 76/11 |
| 2020/0037220 A1* | 1/2020 | Velev | H04W 76/27 |
| 2020/0196375 A1* | 6/2020 | Ryu | H04W 76/34 |
| 2020/0221527 A1* | 7/2020 | Bharatia | H04W 76/20 |
| 2020/0305118 A1* | 9/2020 | Ryu | H04W 76/10 |
| 2022/0256309 A1* | 8/2022 | Syue | H04L 12/4633 |
| 2024/0381287 A1* | 11/2024 | Watfa | H04W 76/20 |

FOREIGN PATENT DOCUMENTS

WO WO-2017151437 A1 * 9/2017 ............ H04W 76/12

\* cited by examiner

*Primary Examiner* — Kenny S Lin
(74) *Attorney, Agent, or Firm* — Bridgeway IP Law Group, PLLC; Jihun Kim

(57) ABSTRACT

According to one embodiment of this specification, there is provided an operation method of user equipment (UE). The method may comprise: if the UE is using an Evolved Packet System (EPS) service with control plane Cellular Internet of Things (CIoT) EPS optimization with overhead reduction, generating an EPS Mobility Management (EMM) transport message. The EMM transport message may include a protocol discriminator, a security header type, a message authentication code and a sequence number. If the EMM transport message is sent in an EMM data transport procedure or if the EMM transport message is sent in a service request procedure for UE using the EPS service with control plane CIoT EPS optimization with overhead reduction to send a user data, a short message service (SMS) message or a location service (LCS) message, the EMM transport message may further include a data container.

12 Claims, 11 Drawing Sheets

METHOD FOR GENERATING EMM TRANSPORT MESSAGE

CROSS-REFERENCE TO RELATED APPLICATIONS

This application claims the priority of Korean Patent Applications No. 10-2025-0073959 filed on Jun. 5, 2025 and No. 10-2025-0095140 filed on Jul. 15, 2025, in the Korean Intellectual Property Office, the disclosure of which is incorporated herein by reference.

BACKGROUND OF THE DISCLOSURE

Field of the Disclosure

The present specification relates to a 3GPP wireless communication system.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the |

TABLE 1-continued

| REFERENCE POINT | DESCRIPTION |
|---|---|
| | S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1. S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

SUMMARY OF THE DISCLOSURE

The disclosure of this specification aims to provide a method for generating EMM transport message.

According to one embodiment of this specification, there is provided an operation method of user equipment (UE). The method may comprise: if the UE is using an Evolved Packet System (EPS) service with control plane Cellular Internet of Things (CIoT) EPS optimization with overhead reduction, generating an EPS Mobility Management (EMM) transport message. The EMM transport message may include a protocol discriminator, a security header type, a message authentication code and a sequence number. If the EMM transport message is sent in an EMM data transport procedure or if the EMM transport message is sent in a service request procedure for UE using the EPS service with control plane CIoT EPS optimization with overhead reduction to send a user data, a short message service (SMS) message or a location service (LCS) message, the EMM transport message may further include a data container.

According to one embodiment of this specification, there is also provided a user equipment (UE). The UE may comprise: at least one processor; and at least one computer memory operably connectable to the at least one processor and storing instructions that, when executed by the at least one processor, perform operations comprising: if the UE is using an Evolved Packet System (EPS) service with control plane Cellular Internet of Things (CIoT) EPS optimization with overhead reduction, generating an EPS Mobility Management (EMM) transport message. The EMM transport message may include a protocol discriminator, a security header type, a message authentication code and a sequence number. If the EMM transport message is sent in an EMM data transport procedure or if the EMM transport message is sent in a service request procedure for UE using the EPS service with control plane CIoT EPS optimization with overhead reduction to send a user data, a short message service (SMS) message or a location service (LCS) message, the EMM transport message may further include a data container.

According to one embodiment of this specification, there is also provided a semiconductor chipset. The semiconductor chipset may comprise: at least one processor; and at least one memory capable of storing instructions and being connected electrically to the at least one processor operably. Operations, performed when the instructions are executed by the at least one processor, may comprise: if the UE is using an Evolved Packet System (EPS) service with control plane Cellular Internet of Things (CIoT) EPS optimization with overhead reduction, generating an EPS Mobility Management (EMM) transport message. The EMM transport message may include a protocol discriminator, a security header type, a message authentication code and a sequence number. If the EMM transport message is sent in an EMM data transport procedure or if the EMM transport message is sent in a service request procedure for UE using the EPS service with control plane CIoT EPS optimization with overhead reduction to send a user data, a short message service (SMS) message or a location service (LCS) message, the EMM transport message may further include a data container.

The method or the operations may further comprise: transmitting the EMM transport message as integrity protected.

If the data container is included in the EMM transport message, the EMM transport message may be transmitted partially ciphered.

The data container may be deciphered using a ciphering algorithm of a current EPS security context.

The data container may contain a data payload and control information associated with the data payload.

According to the disclosure of this specification, there is provided a method for generating EMM transport message.

DESCRIPTION OF EXEMPLARY EMBODIMENTS

Figure 1:
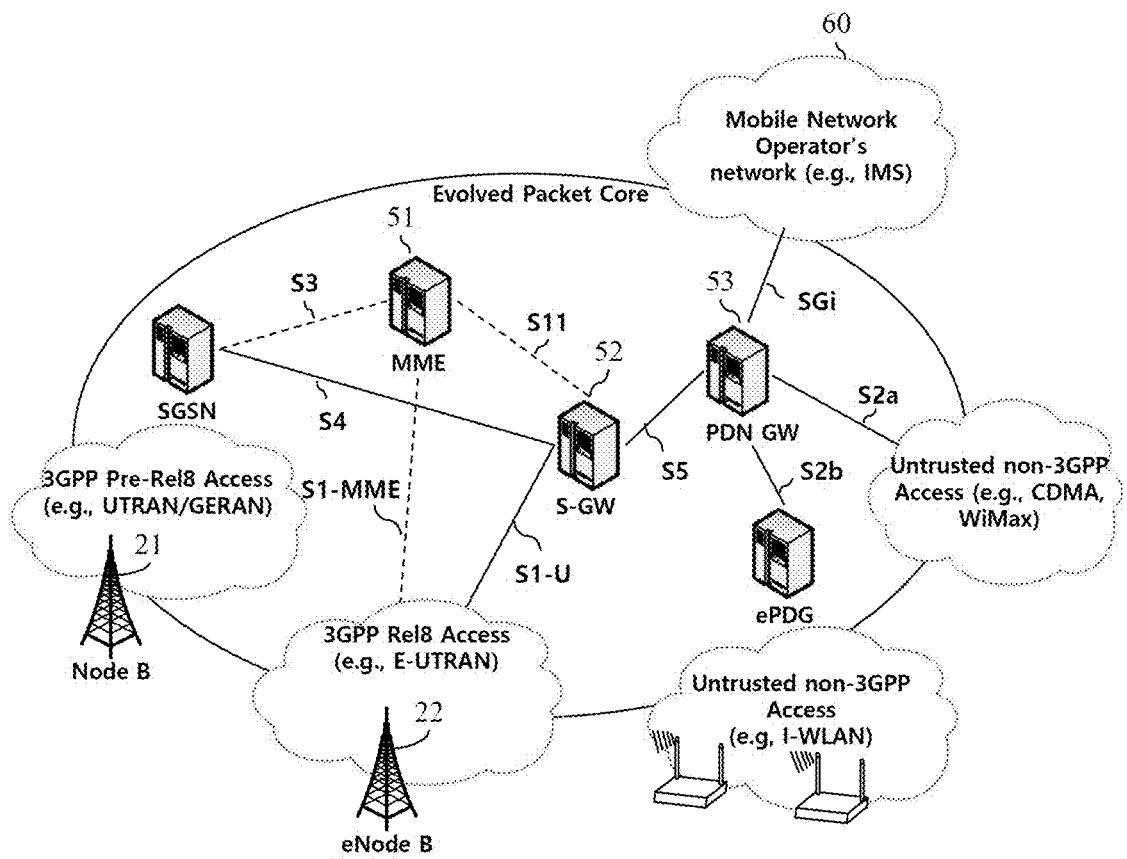
FIG. 1 is a view illustrating the structure of an evolved mobile communication network.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

DEFINITION OF TERMS

For a better understanding, the terms used herein are briefly defined before going to the detailed description of the invention with reference to the accompanying drawings.

UMTS: stands for Universal Mobile Telecommunication System and means a 3rd generation mobile communication network.

UE/MS: User Equipment/Mobile Station. Means a terminal device.

EPC: stands for Evolved Packet Core and means a core network supportive of a long term evolution (LTE) network. An evolved version of UMTS EPS: stands for Evolved Packet System and means a mobile communication system including a UE, an access network including LTE, and an EPC PDN (Public Data Network): an independent network in which a service providing server is located PDN connection: connection from UE to PDN, i.e., association (connection) between a UE represented with an IP address and a PDN represented with an APN (access point name)

PDN-GW (Packet Data Network Gateway): a network node of an EPS network performing functions such as UE IP address allocation, packet screening & filtering, and charging data collection Serving GW (Serving Gateway): a network node of an EPS network performing functions such as mobility anchor, packet routing, idle mode packet buffering, and triggering MME to page UE PCRF (Policy and Charging Rule Function): an EPS network node performing policy decision for dynamically applying QoSs and billing policies differentiated per service flow APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

TEID (Tunnel Endpoint Identifier): End point ID of a tunnel configured between nodes in a network. A TEID is configured per section by the bearer of each UE.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e) NodeB: Collectively Denotes NodeB and eNodeB

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameters associated with NAS functionality Hereinafter, the present disclosure is described with reference to the accompanying drawings.

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

Figure 2:
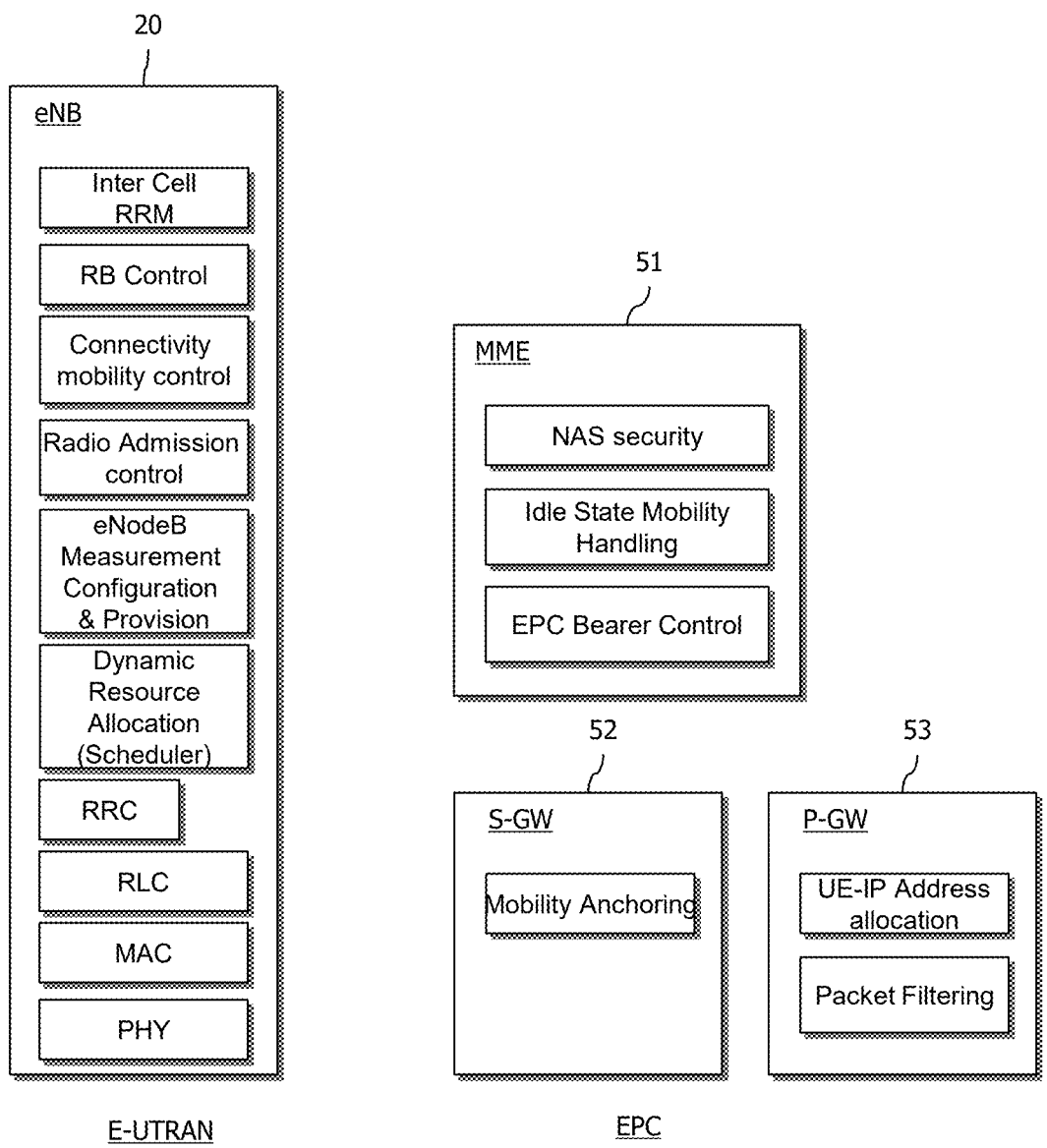
FIG. 2 is an exemplary view illustrating functions of main nodes of a common E-UTRAN and a common EPC.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

Figure 3:
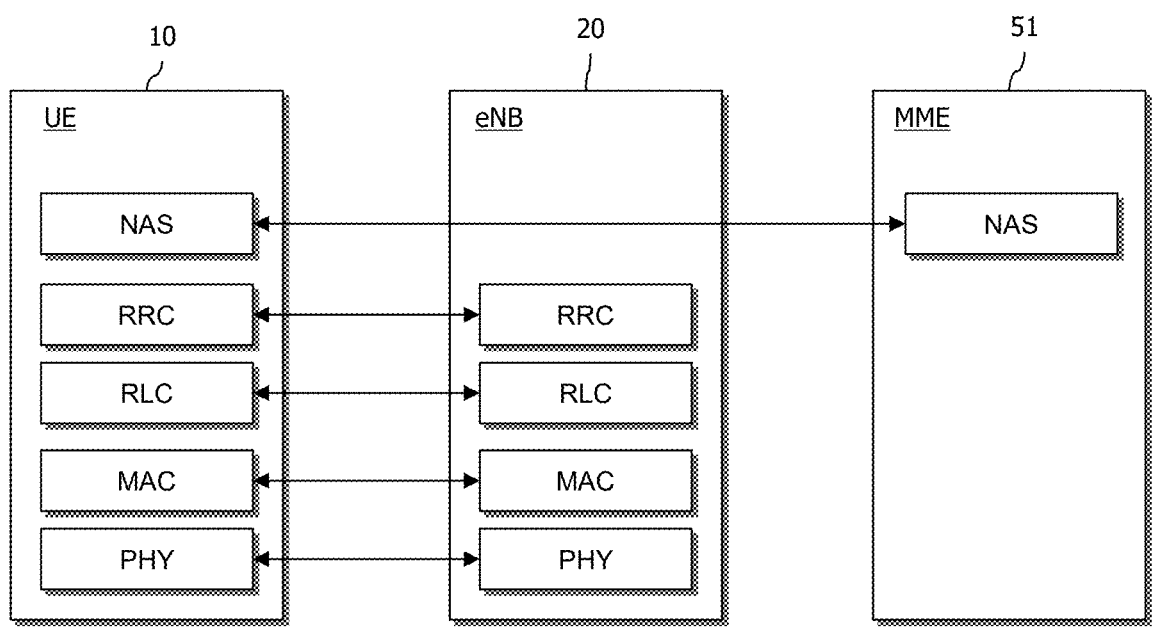
FIG. 3 is an exemplary view illustrating the structure of a radio interface protocol in a control plane between a UE and an eNodeB.
Figure 4:
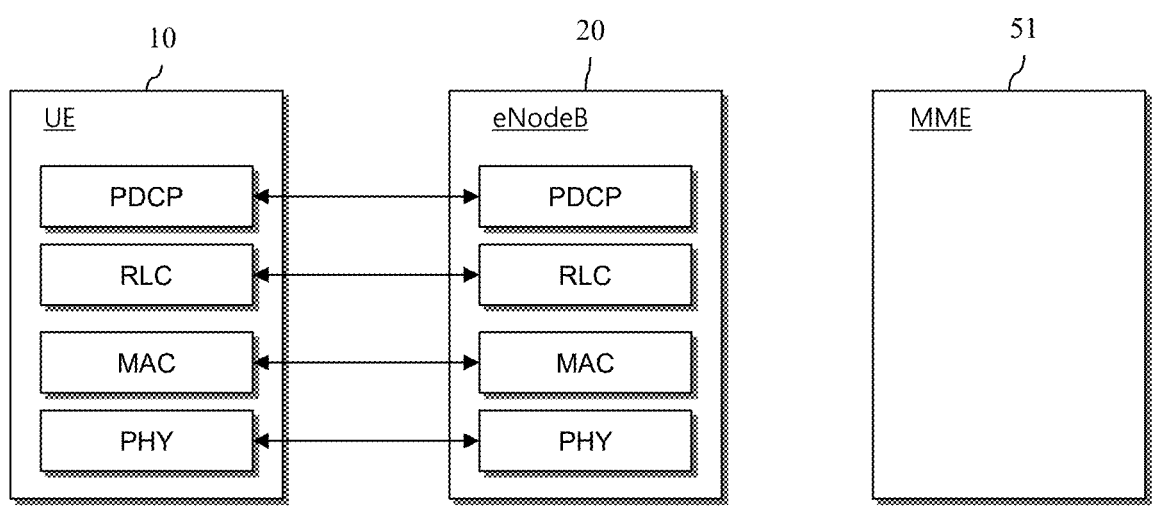
FIG. 4 is another exemplary view illustrating the structure of a radio interface protocol in a user plane between a UE and a base station.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VOIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VOIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Figure 5:
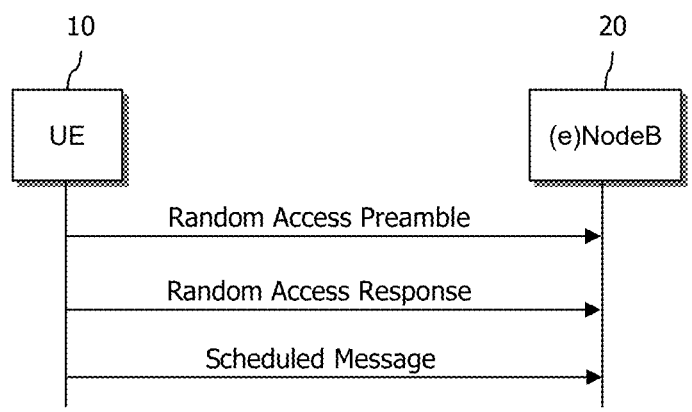
FIG. 5 is a flowchart illustrating a random access procedure in 3GPP LTE.

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

Figure 6:
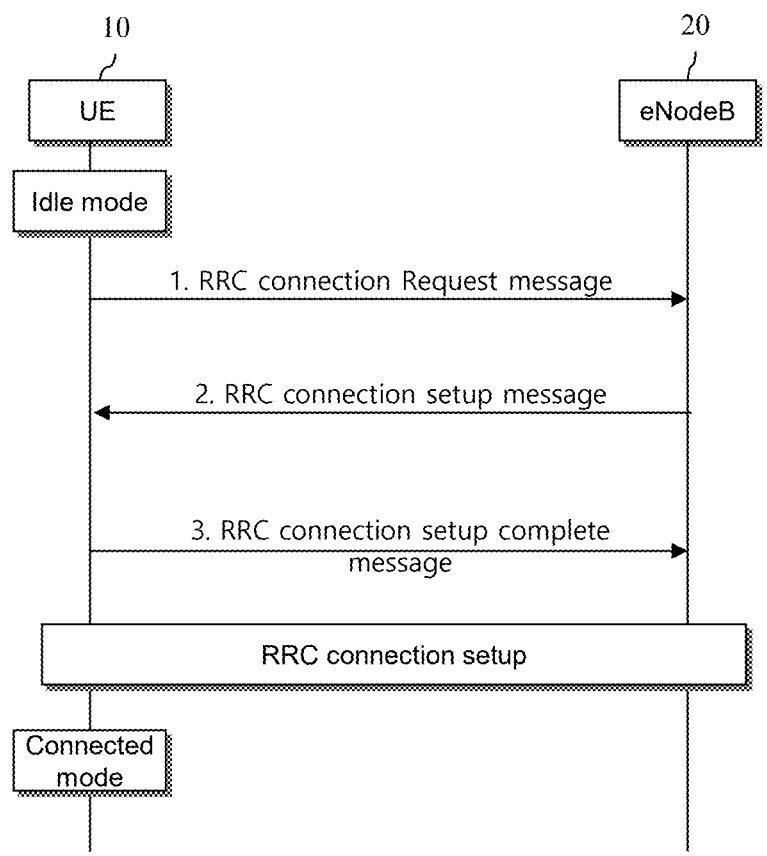
FIG. 6 illustrates a connection process in a radio resource control (RRC) layer.

FIG. 6 illustrates a connection process in a radio resource control (RRC) layer.

FIG. 6 shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

Figure 7:
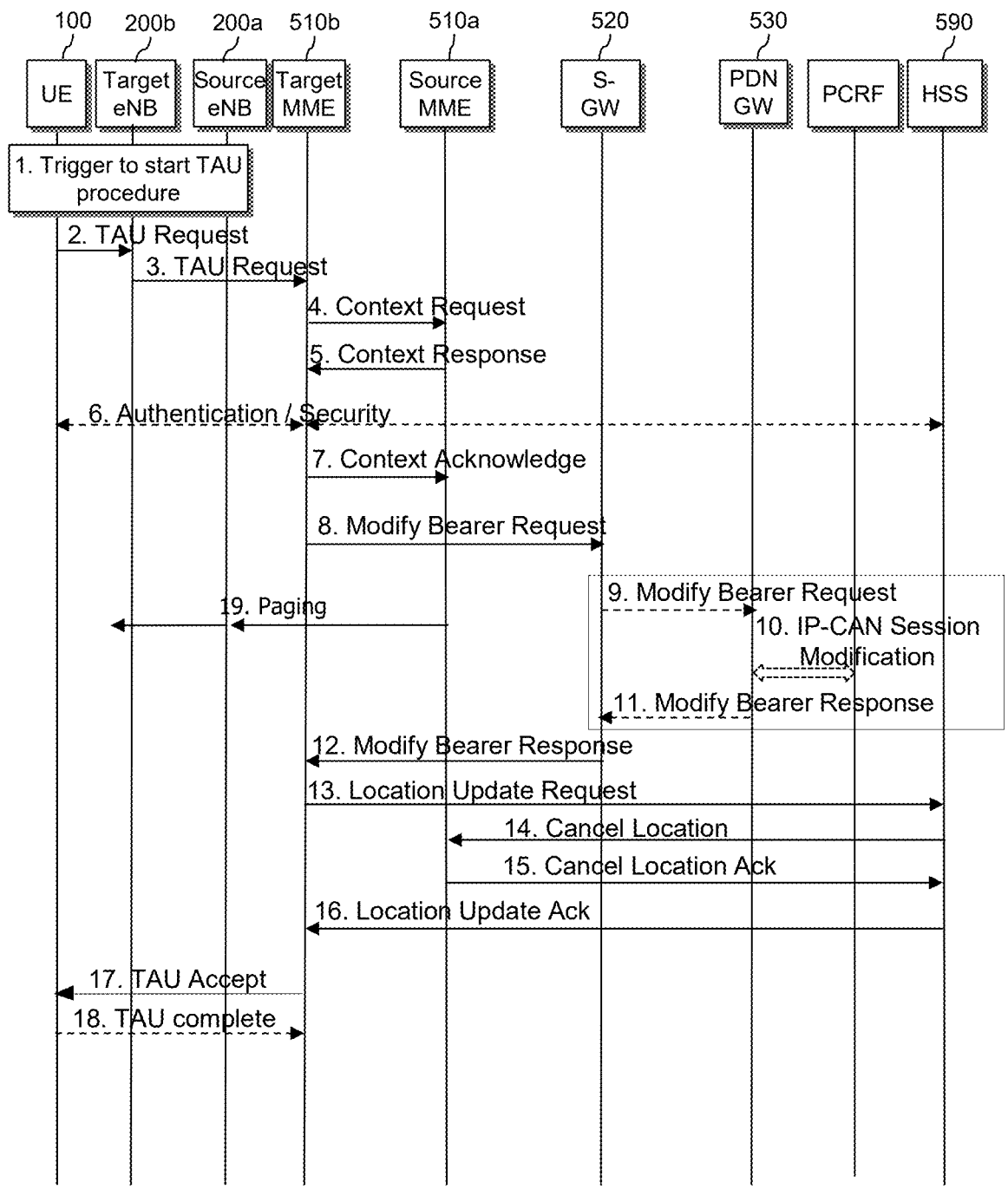
FIG. 7 is an exemplary view illustrating a Tracking Area Update (TAU) procedure.

FIG. 7 shows an exemplary Tracking Area Update (TAU) procedure.

1) In idle mode, the UE 100 moves into the coverage of the target eNodeB 200b. Accordingly, a Tracking Area Update (TAU) procedure is determined to start.

2) Then, the UE 100 sends a TAU request message to the target eNodeB 200b.

3) Then, the target eNodeB 200b determines a responsible MME. In this case, assume, for example, that the target MME 510b is determined as a proper responsible MME. The target eNodeB 200b transfers the TAU request message to the target MME 510b. In this case, assume that the S-GW 520 is not changed.

4-5) Then, the target MME 510b sends the UE's context request (e.g., Context Request) to the source MME 510a, and in response, receives a context response (e.g., Context Response). This is a process to obtain PDN connection-related information and EPS bearer-related information from the source MME 510a.

6) The UE 100 conducts an authentication/security procedure with the target MME 510b, and the target MME 510b conducts a security procedure with the HSS 590.

7) Meanwhile, the target MME 510b transmits to the source MME 510a a context acknowledge (e.g., Context Acknowledge) message in response to obtaining the context.

8) Subsequently, the target MME 510b, since the S-GW 520 is not changed by the TAU, transmits to the S-GW 520 a bearer modification request message (e.g., Modify Bearer Request), not a session creation request message (e.g., Create Session Request).

9-11) Then, the S-GW 520 transmits a bearer modification request message to the PDN-GW 530 as necessary. The PDN-GW 530 performs an IP-CAN session modification procedure as necessary. The PDN-GW 530 transmits a bearer modification response message (e.g., Modify Bearer Response) to the S-GW 520.

12) Then, the S-GW 520 transmits a bearer modification response message to the target MME 510b.

13) Then, the target MME 510b transmits to the HSS 590 a location update request message (e.g., Update Location Request).

14-15) Then, the HSS 590 transmits a location cancel message (e.g., Cancel Location) to the source MME 510a, and the source MME 510a transmits a location cancel acknowledgement message (e.g., Cancel Location Ack) to the HSS 590.

16) Then, the HSS 590 transmits a location update acknowledgement message (e.g., Update Location Ack) to the target MME 510b.

17-18) Then, the target MME 510b transmits a TAU accept message (e.g., TAU accept) to the UE 100 through the target eNodeB 200b, and the UE 100 transmits a TAU complete message (e.g., TAU Complete) to the target MME 510b as necessary.

Hereinafter, the following Table 2 to Table 9 show the messages used in each process.

First, the TAU request message may contain one or more pieces of information as shown in Table 2.

TABLE 2

Protocol discriminator
Security header type
Tracking area update request message identity
EPS update type
NAS key set identifier
Old GUTI
Non-current native NAS key set identifier
GPRS ciphering key sequence number
Old P-TMSI signature
Additional GUTI
NonceUE
UE network capability
Last visited registered TAI
DRX parameter
UE radio capability information update needed
EPS bearer context status
MS network capability
Old location area identification
TMSI status
Mobile station classmark 2
Mobile station classmark 3
Supported Codecs
Additional update type
Voice domain preference and UE's usage setting
Old GUTI type
Device properties
MS network feature support
TMSI based NRI container The EPC Update type information element shown in Table 2 above may contain the following bits.

TABLE 3

EPC Update Type Value
000: indicates TAU
001: indicates joint update of TAU/LA(Location Area)
010: indicates joint update of TAU/LA (Location Area) together with IMSI attach
011: indicates periodic update
100: unused (if used, interpreted as TAU)
101: unused (if used, interpreted as TAU)
"Active" flag (octet 1, bit 4)
0: bearer creation not requested
1: bearer creation requested Meanwhile, the above-described context request message may contain the information elements shown in the following Table 4.

TABLE 4

| Information elements | Conditions/descriptions |
|---|---|
| IMSI | should be included in case UE successfully authenticated |
| GUTI | A new target MME should include over S10 interface may be included if SRVCC procedure from UTRAN/GERN to E-UTRAN is available |
| Complete TAU request message | a new target MME may include if previous source MME needs it for acknowledgement of no decision |
| RAT Type | indicates what radio access technology is in use |
| Target PLMN ID | if available, may be included for previous MME to determine whether unused authentication vector is to be distributed |
| MME node name | is transferred by a new target MME if the new target MME and associated S-GW both support SR |

Meanwhile, the context response message may contain the information elements shown in the following Table 5.

TABLE 5

| Information element | Conditions/descriptions |
|---|---|
| IMSI | IMSI necessarily included except emergency even when UE does not have UICC |
| MME/SGSN UE EPS PDN Connections | Included in case at least one PDN connection is present for UE. |
| SGW node name | Indicates the identifier that has been used to identify S-GW by previous source MME |
| Trace Information | may be included in case session tracking is activated |
| Subscribed RFSP Index | May be included during mobility procedure between MMEs |
| UE Time Zone | Included by source MME |
| MME node name | Transmitted by previous source MME in case previous MME and associated S-GW both support ISR |

The information on the PDN connection in the context response message may contain the information elements shown in the following Table 6.

TABLE 6

| APN Restriction | Indicates limitations on combinations of APN types for APNs related to bearer context. Target MME or SGSN may determine the largest APN limitation using the APN limitations. |
|---|---|
| Linked EPS Bearer ID | Indicates basic bearer of PDN connection |
| PGW node name | may be included in case source MME has the overall name (e.g., FQDN) of PDN GW |
| Bearer Contexts | a number of pieces of information of such type may be included |
| Charging characteristics | May be included in case billing information is offered by HSS to MME |
| Change Reporting Action | May be included whenever available by source MME |

The bearer context information included in the PDN connection information in the context response may contain the information shown in the following Table 7.

TABLE 7

| Information elements | Conditions/descriptions |
|---|---|
| PGW S5/S8 IP Address and TEID for user plane | May be included for GTP-based S5/S8 |
| Bearer Level QoS BSS Container | MME may include packet flow ID, radio priority, SAPI, PS handover XID parameter in TAU/RAU/handover procedure-related message |
| Transaction Identifier | may be transmitted over S3/S10/S16 in case UE supports A/Gb and/or Iu mode |

The TAU accept message may contain the information shown in the following Table 8.

TABLE 8

| Information | Description |
|---|---|
| TAU accept message identifier | message identifier |
| TAU result | indicate result of update, e.g. success or fail |
| T3412 value | timer value for periodic TAU |

TABLE 8-continued

| Information | Description |
| --- | --- |
| T3402 value | timer starting upon TAU failure |
| T3412 extended value | extended value of T3412 for further lengthening periodic TAU |

In Table 8 above, the T3412 value is a value for allowing the UE 100 to conduct periodic TAU. In order to reduce network load by such periodic TAU, the T3412 extended value is present which allows TAU to be conducted at a longer period. The T3412 extended value May be set up in the MME or may be retained as subscriber information in the HSS 540.

Figure 8:
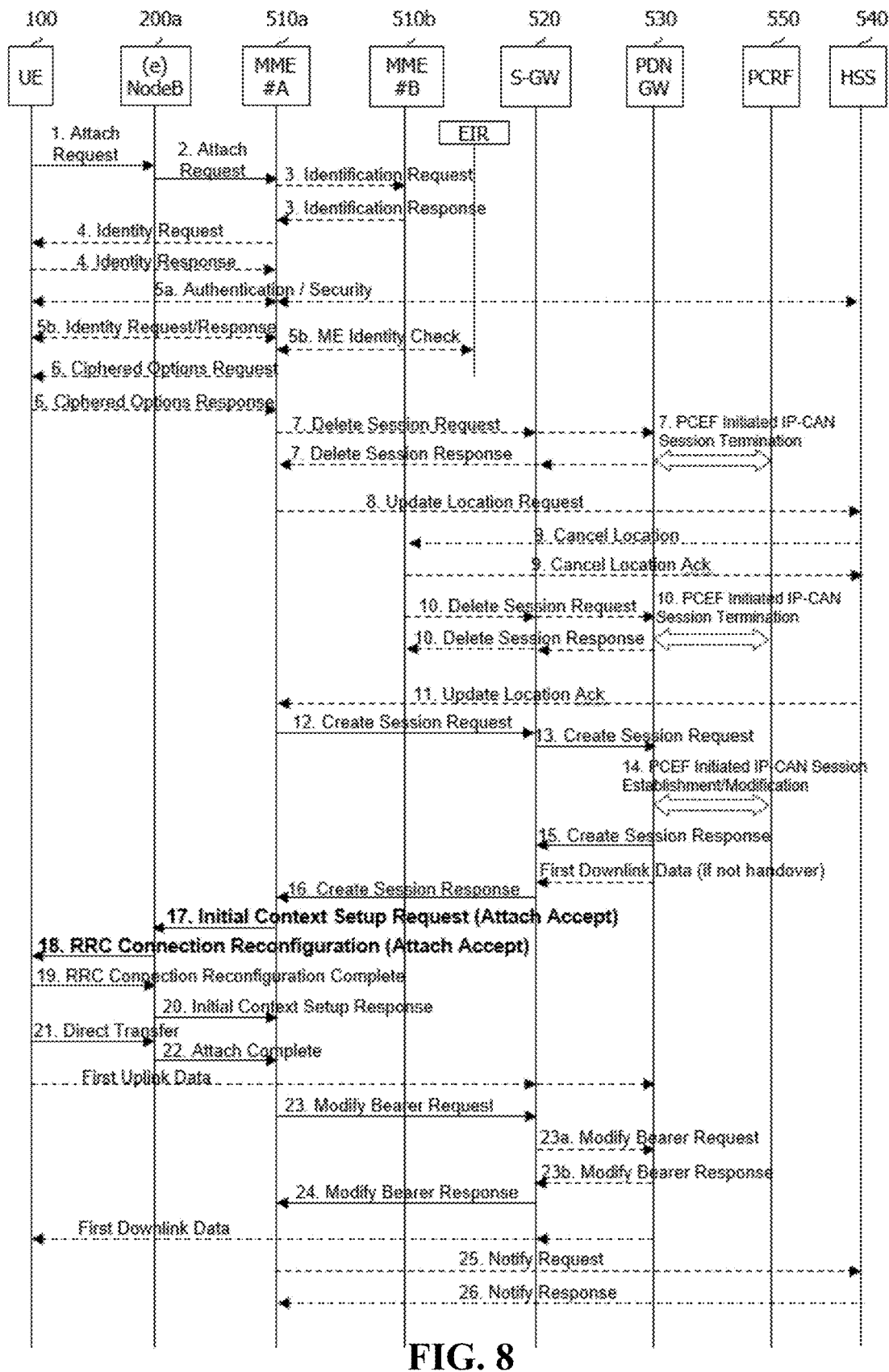
FIG. 8 illustrates a process in which a UE attaches, i.e., connects, to a network.

FIG. 8 illustrates a process in which a UE attaches, i.e., connects, to a network.

1) First, the UE 100 sends (e) an Attach Request message to the NodeB 200*a*.

The attach request message is a message sent by the UE when the UE is powered on or initially performs attach, such as during roaming or handover.

2) The (e) NodeB 200*a* may then receive the attach request message and send the received attach request message to the MME #A 510*a*.

10) The MME #a 510*a* includes an Attach Accept message in an S1-AP based Initial Context Setup message, e.g. an Initial Context Set up Request message, and sends it to the (e) NodeB 200*a*.

The Attach Accept message triggers a radio bearer setup between the (e) NodeB 200*a* and the UE 100.

18-19) The (e) NodeB 200*a* and the UE 100 perform an RRC connection procedure.

20) The (e) NodeB 200*a* sends an Initial Context Setup Response message to the MME #a 510*a*.

22) The (e) NodeB 200*a* sends an Attach Complete message, e.g., Attach Complete, to the MME #A 510*a*. Thus, a tunnel is established between the UE 100 and the S-GW 520. The Attach Complete message includes the TEID of the (e) NodeB 200*a*. As such, the UE 100 may transmit its uplink data to the S-GW 520 via the (e) NodeB 200*a*.

23-24) Meanwhile, the MME #a 510*a* sends a Modify Bearer Request message to the S-GW 520, for example. The modify bearer request message includes the TEID of the (e) NodeB 200*a*. The S-GW 520 sends the Modify Bearer Request message to the P-GW 530, which sends a Response message, e.g., Update Bearer Response message. The S-GW 520 then sends the response message to the MME #a 510*a*. Through this procedure, when the configured bearer is updated, the S-GW 520 transmits downlink data to the UE 100 via the (e) NodeB 200*a*.

The Disclosure of the Present Specification

Figure 9:
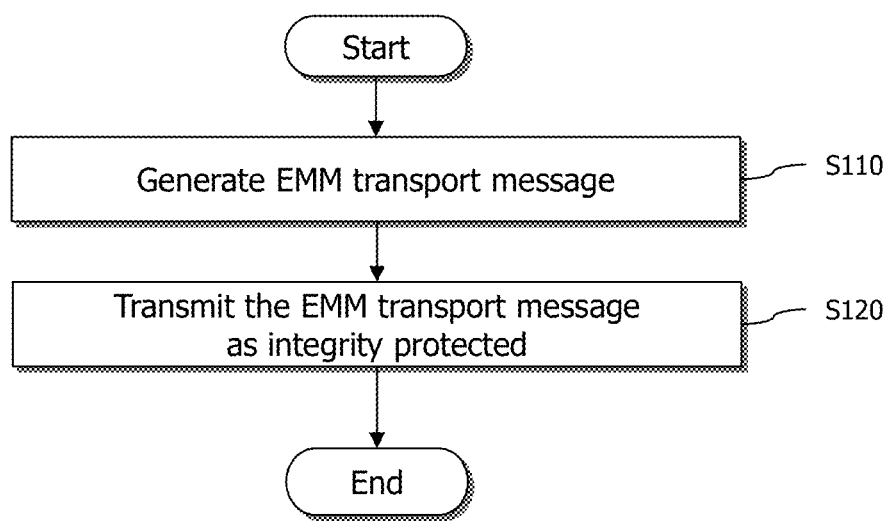
FIG. 9 is an example diagram illustrating a procedure according to one embodiment of this specification.

FIG. 9 is an example diagram illustrating a procedure according to one embodiment of this specification.

Referring to FIG. 9, if the UE is using an Evolved Packet System (EPS) service with control plane Cellular Internet of Things (CIoT) EPS optimization with overhead reduction, the UE may generate an EPS Mobility Management (EMM) transport message S110.

The EMM transport message may include a protocol discriminator, a security header type, a message authentication code and a sequence number.

If the EMM transport message may be sent in an EMM data transport procedure or if the EMM transport message may be sent in a service request procedure for UE using the EPS service with control plane CIoT EPS optimization with overhead reduction to send a user data, a short message service (SMS) message or location service (LCS) message, the EMM transport message may further include a data container.

The UE may transmit the EMM transport message as integrity protected S120.

SUMMARY OF THE EMBODIMENTS OF THIS SPECIFICATION

Control plane CIoT EPS optimization with overhead reduction: Control plane CIoT EPS optimization using EMM messages with reduced protocol overhead.

UE using EPS services with control plane CIoT EPS optimization with overhead reduction: A UE that is attached for EPS services with the control plane CIoT EPS optimization with overhead reduction accepted by the network.

I. First Disclosure
I-1. EMM Transport
Message Definition

This message is sent by the UE or the network when the UE is using EPS services with control plane CIoT EPS optimization with overhead reduction.

Message type: EMM TRANSPORT
Significance: dual
Direction: both

EMM TRANSPORT message content includes the following:

TABLE 9

| Information Element | Type/Reference | Presence | Length |
| --- | --- | --- | --- |
| Protocol discriminator | Protocol discriminator | M | ½ |
| Security header type | Security header type | M | ½ |
| Message authentication code | Message authentication code | M | 4 |
| Sequence number | Sequence number | M | 1 |
| Data container | Data container | O | 2-n |

I-2. Data Container
  This IE shall be included if:
    the EMM TRANSPORT message is sent in the EMM data transport procedure; or
    the EMM TRANSPORT message is sent in the service request procedure for UE using EPS services with control plane CIoT EPS optimization with overhead reduction to send user data. SMS message or LCS message.

I-3. Overview

Within the protocols defined in the present document, every message, except the SERVICE REQUEST message and the EMM TRANSPORT message, is a standard L3 message. This means that the message consists of the following parts:

1) if the message is a plain NAS message:
  a) protocol discriminator;
  b) EPS bearer identity or security header type;
  c) procedure transaction identity;
  d) message type;
  e) other information elements, as required.

2) if the message is a security protected NAS message:
  a) protocol discriminator;
  b) security header type;
  c) message authentication code;
  d) sequence number;
  e) plain NAS message, as defined in item 1.

The organization of a plain NAS message is illustrated in the example shown in below Table.

TABLE 10

| 8 | 7 | 6 | 5 | 4 | 3 | 2 | 1 | |
|---|---|---|---|---|---|---|---|---|
| EPS bearer identity or Security header type | | | | Protocol discriminator | | | | octet 1 |
| Procedure transaction identity | | | | | | | | octet 1a* |
| Message type | | | | | | | | octet 2 |
| Other information elements as required | | | | | | | | octet 3 |
| | | | | | | | | octet n |

Above Table: General message organization example for a plain NAS message

The organization of a security protected NAS message is illustrated in the example shown in below Table.

TABLE 11

| 8 | 7 | 6 | 5 | 4 | 3 | 2 | 1 | |
|---|---|---|---|---|---|---|---|---|
| Security header type | | | | Protocol discriminator | | | | octet 1 |
| Message authentication code | | | | | | | | octet 2 |
| | | | | | | | | octet 5 |
| Sequence number | | | | | | | | octet 6 |
| NAS message | | | | | | | | octet 7 |
| | | | | | | | | octet n |

Above Table: General message organization example for a security protected NAS message The EPS bearer identity and the procedure transaction identity are only used in messages with protocol discriminator EPS session management. Octet 1a with the procedure transaction identity shall only be included in these messages.

Unless specified otherwise in the message descriptions of clause 8, a particular information element shall not be present more than once in a given message.

When a field extends over more than one octet, the order of bit values progressively decreases as the octet number increases. The most significant bit of the field is represented by the highest numbered bit of the lowest numbered octet of the field. The least significant bit of the field is represented by the lowest numbered bit of the highest numbered octet of the field.

The EMM TRANSPORT message consists of the following parts:
a) protocol discriminator;
b) security header type;
c) message authentication code;
d) sequence number; and
e) optional data container.

The organization of the EMM TRANSPORT message is illustrated in the example shown in below Table.

TABLE 12

| 8 | 7 | 6 | 5 | 4 | 3 | 2 | 1 | |
|---|---|---|---|---|---|---|---|---|
| Security header type | | | | Protocol discriminator | | | | octet 1 |
| Message authentication code | | | | | | | | octet 2 |
| | | | | | | | | octet 5 |
| Sequence number | | | | | | | | octet 6 |
| Data container | | | | | | | | octet 7* |
| | | | | | | | | octet n* |

Above Table: General message organization for EMM TRANSPORT

I-4. Data Container

The Data container IE contains the data payload and the control information associated with the data payload, SMS message or LCS message. The control information associated with the data payload depends on the data type.

The Data container IE is a non-standard layer 3 information element.

The Data container IE is coded as shown in below Tables

TABLE 13

| 8 | 7 | 6 | 5 | 4 | 3 | 2 | 1 | |
|---|---|---|---|---|---|---|---|---|
| Data type | | | DDX | | EPS bearer identity | | | octet 1 |
| Data payload | | | | | | | | octet 2 |
| | | | | | | | | octet n |

Above table: Data container IE for Data type "Control plane user data"

TABLE 14

| 8 | 7 | 6 | 5 | 4 | 3 | 2 | 1 | |
|---|---|---|---|---|---|---|---|---|
| Data type | | | DDX | | Spare | | | octet 1 |
| Length of additional information | | | | | | | | octet 2 |
| Additional information | | | | | | | | octet 3* |
| | | | | | | | | octet m* |
| Data payload | | | | | | | | octet o |
| | | | | | | | | octet n |

Above Table: Data container IE for Data type "Location services message container"

TABLE 15

| 8 | 7 | 6 | 5 | 4 | 3 | 2 | 1 | |
|---|---|---|---|---|---|---|---|---|
| Data type | | | | Spare | | | | octet 1 |
| Data payload | | | | | | | | octet 2 |
| | | | | | | | | octet n |

Above Table: Data container IE for Data type "SMS"
Below Table: Data container information element

TABLE 16

Data container (octet 1 to octet n)
Data type (octet 1, bits 6 to 8)
Bits

| 8 | 7 | 6 | |
|---|---|---|---|
| 0 | 0 | 0 | Control plane user data |
| 0 | 0 | 1 | SMS |
| 0 | 1 | 0 | Location services message container |

All other values are reserved.
When the Data type is "Control plane user data":
EPS bearer identity (octet 1, bits 1 to 3)
Bit

| 3 | 2 | 1 | |
|---|---|---|---|
| 0 | 0 | 0 | Reserved |
| 0 | 0 | 1 | EPS bearer identity value 5 |
| 0 | 1 | 0 | EPS bearer identity value 6 |
| 0 | 1 | 1 | EPS bearer identity value 7 |
| 1 | 0 | 0 | EPS bearer identity value 8 |
| 1 | 0 | 1 | EPS bearer identity value 9 |
| 1 | 1 | 0 | EPS bearer identity value 10 |
| 1 | 1 | 1 | EPS bearer identity value 11 |

Downlink data expected (DDX) (octet 1, bits 4 to 5)
Bit

| 5 | 4 | |
|---|---|---|
| 0 | 0 | No information available |

TABLE 16-continued

| | | |
|---|---|---|
| 0 | 1 | No further uplink and no further downlink data transmission subsequent to the uplink data transmission is expected |
| 1 | 0 | Only a single downlink data transmission and no further uplink data transmission subsequent to the uplink data transmission is expected |
| 1 | 1 | reserved | the DDX field is only used in the UE to network direction. In the network to UE direction, the corresponding bits are spare and shall be encoded as zero.
Data payload (octet 2 to octet n)
This field contains the control plane user data.
When the Data type is "SMS":
Bits 1 to 5 of octet 1 are spare and shall be coded as zero.
Data payload (octet 2 to octet n)
This field contains an SMS message.
When the Data type is "Location services message container":
Downlink data expected (DDX) (octet 1, bits 4 to 5)
This field is encoded as for the case when the Data type is "Control plane user data".
Bits 1 to 3 of octet 1 are spare and shall be encoded as zero.
Length of additional information (octet 2) (see NOTE)
This field indicates the length, in octets, of the Additional information field.
Additional information (octets 3 to m)
This field contains additional information if provided by the upper layer location services application.
Data payload (octets o to n)
This field contains the location services message payload.

II. Second Disclosure

II-1. Establishment of Secure Exchange of NAS Messages

When a UE in EMM-IDLE mode establishes a new NAS signalling connection and has a valid current EPS security context, secure exchange of NAS messages can be re-established in the following ways:

1) Except for the cases described in items 3, 4 and 5 below, the UE shall transmit the initial NAS message integrity protected with the current EPS security context, but unciphered. The UE shall include the eKSI indicating the current EPS security context value in the initial NAS message. The MME shall check whether the eKSI included in the initial NAS message belongs to an EPS security context available in the MME, and shall verify the MAC of the NAS message. If the verification is successful, the MME may re-establish the secure exchange of NAS messages:

by replying with a NAS message that is integrity protected and ciphered using the current EPS security context. From this time onward, all NAS messages exchanged between the UE and the MME are sent integrity protected and except for the messages, all NAS messages exchanged between the UE and the MME are sent ciphered; or by initiating a security mode control procedure. This can be used by the MME to take a non-current EPS security context into use or to modify the current EPS security context by selecting new NAS security algorithms; or 2) If the initial NAS message was a SERVICE REQUEST message or EXTENDED SERVICE REQUEST message, secure exchange of NAS messages is triggered by the indication from the lower layers that the user plane radio bearers are successfully set up. After successful completion of the procedure, all NAS messages exchanged between the UE and the MME are sent integrity protected and except for the messages, all NAS messages exchanged between the UE and the MME are sent ciphered.

3) If the UE has no current EPS security context and performs a tracking area updating procedure after an inter-system change in idle mode from A/Gb mode to S1 mode or Iu mode to S1 mode, the UE shall send the TRACKING AREA UPDATE REQUEST message without integrity protection and encryption. The UE shall include a nonce and a GPRS ciphering key sequence number for creation of a mapped EPS security context. The MME creates a fresh mapped EPS security context and takes this context into use by initiating a security mode control procedure and this context becomes the current EPS security context in both the UE and the MME. This re-establishes the secure exchange of NAS messages.

4) If the initial NAS message is a CONTROL PLANE SERVICE REQUEST message, the UE shall send the message integrity protected. If an ESM message container information element or a NAS message container information element is included the message shall be sent partially ciphered, otherwise the message shall be sent unciphered. Secure exchange of NAS messages is re-established in the UE:

by the indication from the lower layers that the user plane radio bearers are successfully set up;

upon receipt of a NAS message (e.g. a SERVICE ACCEPT message or ESM DATA TRANSPORT message) that is integrity protected and ciphered using the current EPS security context; or upon receipt of a SECURITY MODE COMMAND message that has successfully passed the integrity check.

5) If the initial NAS message is an EMM TRANSPORT message, the UE shall send the message integrity protected. If the Data container information element is included the message shall be sent partially ciphered, otherwise the message shall be sent unciphered. Secure exchange of NAS message is re-established in the UE in the same way as in bullet 4) above.

Upon receiving an EMM TRANSPORT message including the Data container information element, the MME shall decipher the Data container information element using the ciphering algorithm of the current EPS security context.

II-2. Integrity Protection and Verification

The sender shall use its locally stored NAS COUNT as input to the integrity protection algorithm.

The receiver shall use the NAS sequence number included in the received message (or estimated from the 5 bits of the NAS sequence number received in the message) and an estimate for the NAS overflow counter to form the NAS COUNT input to the integrity verification algorithm.

The algorithm to calculate the integrity protection information is specified, and the integrity protection shall include octets 6 to n of the security protected NAS message, i.e. the sequence number IE and the NAS message IE. The integrity protection shall include octets 6 to n of the EMM TRANSPORT message. The integrity protection of the SERVICE REQUEST message is defined. In addition to the data that is to be integrity protected, the constant BEARER ID, DIRECTION bit, NAS COUNT and NAS integrity key are input to the integrity protection algorithm.

After successful integrity protection validation, the receiver shall update its corresponding locally stored NAS COUNT with the value of the estimated NAS COUNT for this NAS message.

Integrity verification is not applicable when EIA0 is used.

II-3. Ciphering and Deciphering

The sender shall use its locally stored NAS COUNT as input to the ciphering algorithm.

The receiver shall use the NAS sequence number included in the received message (or estimated from the 5 bits of the NAS sequence number received in the message) and an estimate for the NAS overflow counter to form the NAS COUNT input to the deciphering algorithm.

The input parameters to the NAS ciphering algorithm are the constant BEARER ID, DIRECTION bit, NAS COUNT, NAS encryption key and the length of the key stream to be generated by the encryption algorithm. When an initial plain NAS message for transport of user data via control plane (i.e. CONTROL PLANE SERVICE REQUEST message) is to be partially ciphered, the length of the key stream is set to:
 a) for the CONTROL PLANE SERVICE REQUEST message, the length of the part of the initial plain NAS message (i.e. the value part of the ESM message container IE or the value part of the NAS message container) that is to be ciphered;
 b) for the EMM TRANSPORT message, the length of the portion of the message starting with octet 7 (inclusive) until the end of the message.

II-4. Ciphering of NAS Signalling Messages

The use of ciphering in a network is an operator option subject to MME configuration. When operation of the network without ciphering is configured, the MME shall indicate the use of "null ciphering algorithm" EEA0 in the current security context for all UEs. For setting the security header type in outbound NAS messages, the UE and the MME shall apply the same rules irrespective of whether the "null ciphering algorithm" or any other ciphering algorithm is indicated in the security context.

When the UE establishes a new NAS signalling connection, it shall send the initial NAS message
 a) partially ciphered, if it is:
 i) a CONTROL PLANE SERVICE REQUEST message including an ESM message container information element or a NAS message container information element; or
 ii) an EMM TRANSPORT message including Data container information element; and
 b) unciphered, if it is any other initial NAS message.

The UE shall partially cipher the CONTROL PLANE SERVICE REQUEST message by ciphering the value part of the ESM message container IE or the value part of the NAS message container, using the ciphering algorithm of the current EPS security context.

The UE shall partially cipher the EMM TRANSPORT message by ciphering the part of the message consisting of octet 7 and all subsequent octets, using the ciphering algorithm of the current EPS security context.

Once the encryption of NAS messages has been started between the MME and the UE, the receiver shall discard the unciphered NAS messages which shall have been ciphered according to the rules described in this specification. The MME shall discard any:
 CONTROL PLANE SERVICE REQUEST message including an ESM message container information element or a NAS message container information element; and
 EMM TRANSPORT message including Data container information element.

II-5. CIoT EPS Optimizations

CIoT EPS optimizations provide improved support of small data and SMS transfer. A UE supporting CIoT EPS optimizations can indicate the CIoT network behaviour the UE can support and prefers to use during attach or tracking area updating procedure. The UE may indicate the support for control plane CIoT EPS optimization, user plane CIoT EPS optimization, EMM-REGISTERED without PDN connection, S1-U data transfer, header compression and control plane CIoT EPS optimization with overhead reduction. The UE may also request to use SMS transfer without combined attach procedure during the attach procedure. Furthermore, the UE may, separately from the indication of support, indicate preference for control plane CIoT EPS optimization or user plane CIoT EPS optimization. The indication of preference is also considered as the request to use. A UE supporting CIoT 5GS optimizations can also indicate the 5GS CIoT network behaviour the UE can support during attach or tracking area updating procedure. Furthermore, the UE may, separately from the indication of support, indicate preference for control plane CIoT 5GS optimization or user plane CIoT 5GS optimization.

NOTE 1: The UE supporting control plane CIoT EPS optimization and S1-U data transfer but not user plane CIoT EPS optimization does not indicate preference for user plane CIoT EPS optimization.

The UE can be in NB-S1 mode or WB-S1 mode when requesting the use of CIoT EPS optimizations during an attach or tracking area updating procedure. A UE in NB-S1 mode always indicates support for control plane CIoT EPS optimization. A UE in NB-S1 mode can also request SMS transfer without combined procedure by using the normal attach or tracking area updating procedure.

In NB-S1 mode, the UE, when requesting the use of CIoT EPS optimization, does not:
 request an attach for emergency bearer services procedure;
 request an attach procedure for initiating a PDN connection for emergency bearer services with attach type not set to "EPS emergency attach";
 indicate voice domain preference and UE's usage setting; or
 request an attach for access to RLOS.

The network does not indicate to the UE support of emergency bearer services when the UE is in NB-S1 mode.

The control plane CIoT EPS optimization enables support of efficient transport of user data (IP, non-IP, Ethernet) or SMS messages over control plane via the MME without triggering data radio bearer establishment. The support of control plane CIoT EPS optimization is mandatory for the network in NB-S1 mode and optional in WB-S1 mode. Optional header compression of IP data can be applied to IP PDN type PDN connections that are configured to support header compression.

The UE may support control plane CIoT EPS optimization with overhead reduction in NB-S1 mode. The UE may support control plane CIoT EPS optimization with overhead reduction in WB-S1 mode.

The network may support control plane CIoT EPS optimization with overhead reduction in NB-S1 mode. The network may support control plane CIoT EPS optimization with overhead reduction in WB-S1 mode.

A UE supporting control plane CIoT EPS optimization with overhead reduction shall support control plane CIoT EPS optimization. A UE supporting control plane CIoT EPS optimization with overhead reduction indicates support for control plane CIoT optimization with overhead reduction during the attach or tracking area updating procedure.

A network supporting control plane CIoT EPS optimization with overhead reduction shall support control plane CIoT EPS optimization. A network supporting control plane CIoT EPS optimization with overhead reduction indicates support for control plane CIoT optimizations with overhead reduction during the attach or tracking area updating procedure.

If both the UE and the network support control plane CIoT optimization with overhead reduction, then the UE and the network may initiate data transfer using:

Service request procedure for UE using EPS services with control plane CIoT optimization with overhead reduction; and EMM data transport procedure.

II-6. UE is Using EPS Services with Control Plane CIoT EPS Optimization with Overhead Reduction For response to paging, sending user data, sending SMS or sending LCS message, the UE may use EMM TRANSPORT message.

For response to paging, the UE may include Data container in the EMM TRANSPORT message For sending user data, if the UE has pending IP, non-IP or Ethernet user data that is to be sent via the control plane radio bearers, the UE, shall include the user data in the data payload of the Data container information element of the EMM TRANSPORT message, and set the Data type to "Control plane user data".

For sending SMS, the UE shall include the SMS message in the Data container information element and set the Data type to "SMS".

For sending LCS message, the UE shall include the LCS message in the Data container information element and set the Data type to set the Data type to "Location services message container".

The UE shall set the DDX field if present, send the message, start T3417 and enter the state EMM-SERVICE-REQUEST-INITIATED.

If the UE supports the CP-EDT, the UE shall provide the SHORT CONTROL PLANE SERVICE REQUEST message in the NAS request to the lower layer to establish an RRC connection.

This procedure is intended for data transfer with reduced overhead over satellite access.

II-7. EMM Data Transport Procedure

The purpose of the EMM data transport procedure is to carry user data, SMS and LCS in an encapsulated form between the MME and the UE. The procedure may be initiated by the UE or the network and can only be used when:

1) the UE is attached for EPS services; and
2) both the UE and the network have indicated the support of control plane CIoT EPS optimization with overhead reduction during the attach procedure or tracking area updating procedure.

The procedure may be initiated by the UE or the network when the UE is in EMM-CONNECTED mode.

This procedure is intended for data transfer with reduced overhead over satellite access.

II-8. UE Initiated EMM Data Transport Procedure

Upon receipt of a request to transfer user data, SMS and LCS via the control plane, the UE initiates the procedure by sending the EMM TRANSPORT message. The length of the data payload should not exceed the link MTU size for the respective type of user data (IPv4, IPv6 or Non-IP). If the user data in the payload is an Ethernet frame, then the length of the Ethernet frame payload should not exceed the Ethernet frame payload MTU size.

NOTE: The recommended maximum size for link MTU is 1358 octets to prevent fragmentation in the backbone network. Depending on the network configuration, setting link MTU size to a value larger than 1358 octets could lead to inefficient core network implementation due to fragmentation.

The UE shall include a Downlink data expected (DDX) IE in the message and set it in the same way as the Release assistance indication IE in clause 6.6.4.2.

When receiving the EMM TRANSPORT message, the MME shall identify the PDN connection to the SCEF or to the PDN GW, based on the EPS bearer identity included in message, and forward the data payload accordingly. The MME initiate release of the NAS signalling connection:

1) immediately, if the Downlink data expected IE indicates that no further uplink and no further downlink data transmission subsequent to the uplink data transmission is expected; or
2) upon subsequent delivery of the next received downlink data transmission to the UE if the Downlink data expected IE indicates that only a single downlink data transmission and no further uplink data transmission subsequent to the uplink data transmission is expected.

Figure 10:
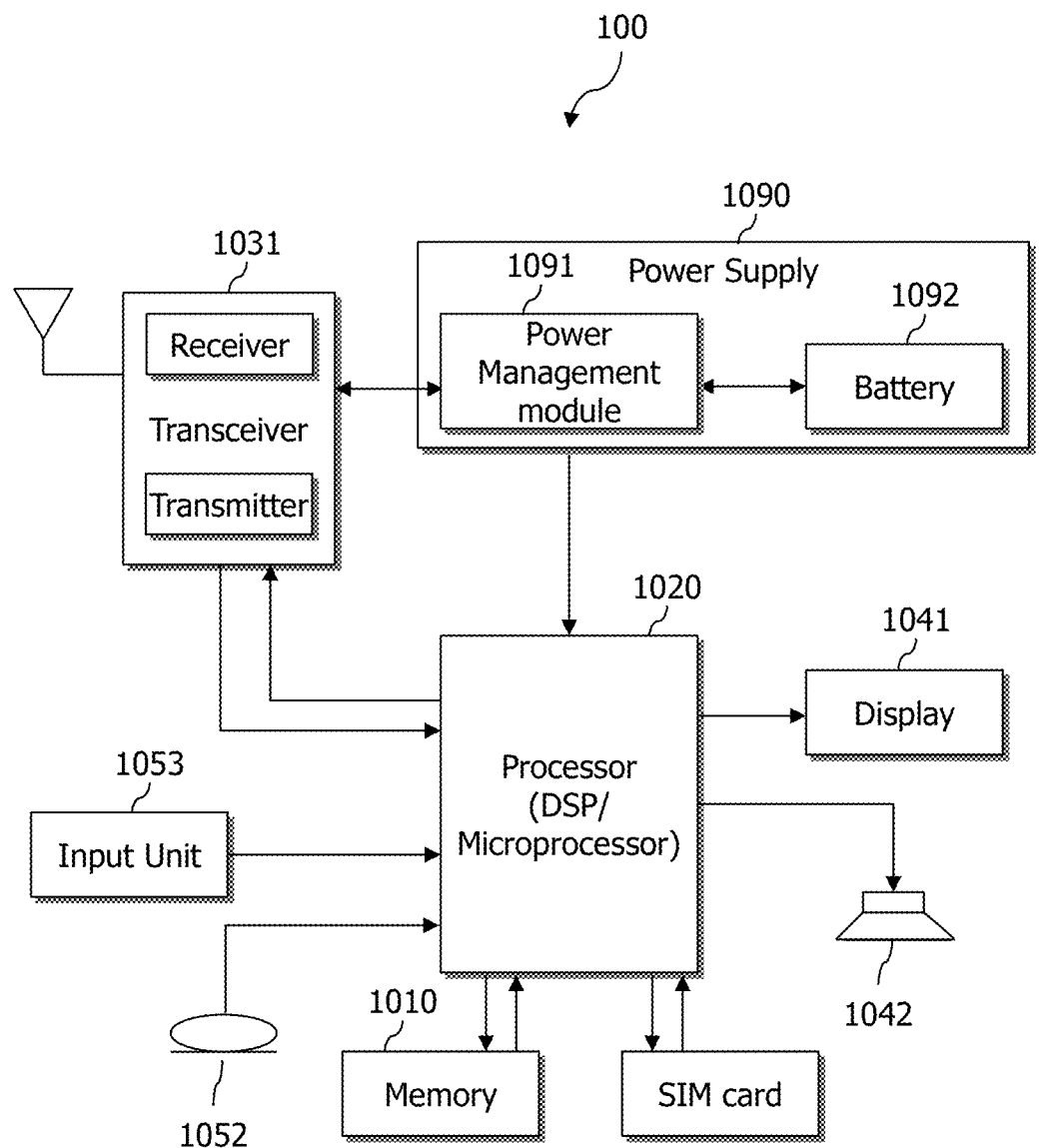
FIG. 10 is a block diagram showing a structure of a UE 100 according to an embodiment.

FIG. 10 is a block diagram showing a structure of a UE according to an embodiment.

A UE 100 includes a memory 1010, a processor 1020, a transceiver 1031, a power management module 1091, a battery 1092, a display 1041, an input unit 1053, a speaker 1042, a microphone 1052, a subscriber identification module (SIM) card, and one or more antennas.

The processor 1020 may be configured to implement the proposed functions, procedures, and/or methods described in the present specification. Layers of a radio interface protocol may be implemented in the processor 1020. The processor 1020 may include application-specific integrated circuits (ASICs), other chipsets, logic circuits, and/or data processing units. The processor 1020 may be an application processor (AP). The processor 1020 may include at least one of a digital signal processor (DSP), a central processing unit (CPU), a graphics processing unit (GPS), and a modulator and demodulator (modem). An example of the processor 1020 may include an SNAPDRAGON™ series processor manufactured by Qualcomm®, an EXYNOS™ series processor manufactured by Samsung®, an A series processor manufactured by Apple®, a HELIO™ series processor manufactured by MediaTek®, an ATOM™ series processor manufactured by INTEL®, or a corresponding next-generation processor.

The power management module 1091 manages power for the processor 1020 and/or the transceiver 1031. The battery 1092 supplies power to the power management module 1091. The display 1041 outputs a result processed by the processor 1020. The input unit 1053 receives an input to be used by the processor 1020. The input unit 1053 may be displayed on the display 1041. The SIM card is an integrated circuit used to safely store an international mobile subscriber identity (IMSI) used to identify and authenticate a subscriber and a key related thereto in a portable phone and a portable phone device such as a computer. Contacts information may be stored in many SIM cards.

The memory 1010 is operatively coupled to the processor 1020, and stores a variety of information for operating the processor 1020. The memory 1010 may include a read-only memory (ROM), a random access memory (RAM), a flash memory, a memory card, a storage medium, and/or other equivalent storage devices. When the embodiment is implemented in software, the techniques explained in the present specification can be implemented with a module (i.e., procedure, function, etc.) for performing the functions explained in the present specification. The module may be stored in the memory 1010 and may be performed by the processor 1020. The memory 1010 may be implemented inside the processor 1020. Alternatively, the memory 1010 may be implemented outside the processor 1020, and may be coupled to the processor 1020 in a communicable manner by using various well-known means.

The transceiver 1031 is operatively coupled to the processor 1020, and transmits and/or receives a radio signal. The transceiver 1031 includes a transmitter and a receiver. The transceiver 1031 may include a baseband signal for processing a radio frequency signal. The transceiver controls one or more antennas to transmit and/or receive a radio signal. In order to initiate communication, the processor 1020 transfers command information to the transceiver 1031, for example, to transmit a radio signal constituting voice communication data. The antenna serves to transmit and receive a radio signal. When the radio signal is received, the transceiver 1031 may transfer a signal to be processed by the processor 1020, and may convert the signal into a baseband signal. The processed signal may be converted into audible or readable information which is output through the speaker 1042.

The speaker 1042 outputs a result related to a sound processed by the processor 1020. The microphone 1052 receives a sound-related input to be used by the processor 1020.

A user presses (or touches) a button of the input unit 1053 or drives voice (activates voice) by using the microphone 1052 to input command information such as a phone number or the like. The processor 1020 receives the command information, and performs a proper function such as calling the phone number or the like. Operational data may be extracted from the SIM card or the memory 1010. In addition, the processor 1020 may display command information or operational information on the display 1041 for user's recognition and convenience.

Figure 11:
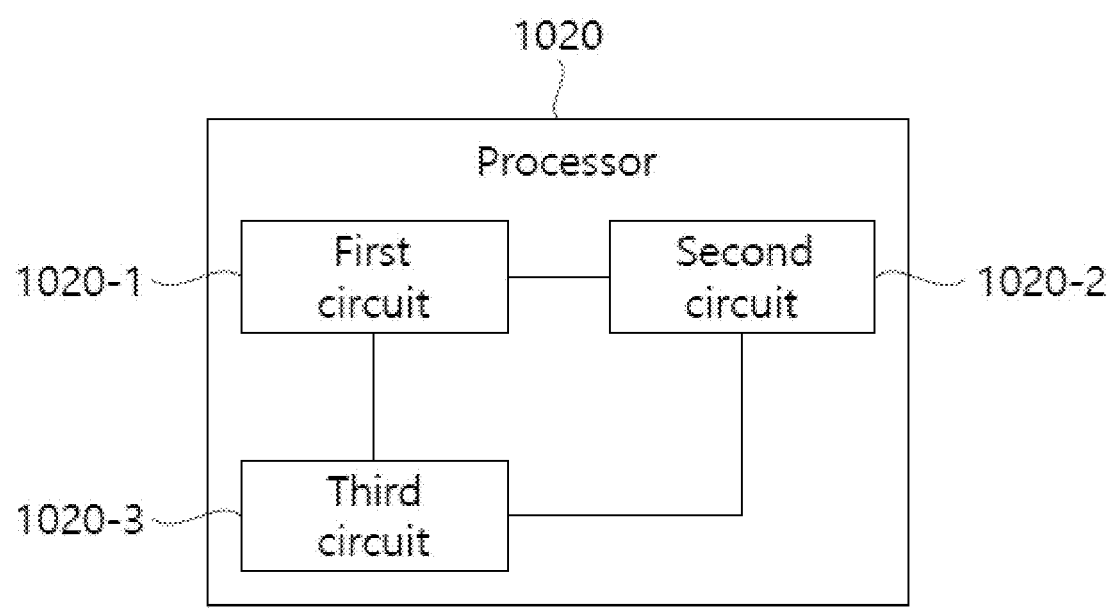
FIG. 11 illustrates a block diagram of a processor in which the present disclosure is implemented.

FIG. 11 illustrates a block diagram of a processor in which the present disclosure is implemented.

As may be seen from FIG. 11, the processor 1020 in which the present disclosure is implemented may include a plurality of circuitry to implement functions, procedures and/or methods described in the present disclosure. For example, the processor 1020 may include a first circuit 1020-1, a second circuit 1020-2, and a third circuit 1020-3. Also, although not shown in the figure, the processor 1020 may include more circuits. Each circuit may include a plurality of transistors.

If the UE is using an Evolved Packet System (EPS) service with control plane Cellular Internet of Things (CIoT) EPS optimization with overhead reduction, the first circuit 1020-1 may generate an EPS Mobility Management (EMM) transport message.

The EMM transport message may include a protocol discriminator, a security header type, a message authentication code and a sequence number.

If the EMM transport message may be sent in an EMM data transport procedure or if the EMM transport message may be sent in a service request procedure for UE using the EPS service with control plane CIoT EPS optimization with overhead reduction to send a user data, a short message service (SMS) message or location service (LCS) message, the EMM transport message may further include a data container.

The second circuit 1020-2 may transmit the EMM transport message as integrity protected.

The processor 1020 may be called Application-Specific Integrated Circuit (ASIC) or Application Processor (AP) and may include at least one of a Digital Signal Processor (DSP), a Central Processing Unit (CPU), and a Graphics Processing Unit (GPU).

The processor may be equipped in the UE.

In the above, preferred embodiments have been described by way of example, but the disclosure of the present specification is not limited to these specific embodiments, and may be modified, changed, or modified in various forms within the scope described in the spirit and claims of the present specification. It can be improved.

In the example system described above, the methods are described on the basis of a flow chart as a series of steps or blocks, but the order of steps described is not limited, and some steps may occur simultaneously or in a different order than other steps as described above. there is. Additionally, those skilled in the art will understand that the steps shown in the flowchart are not exclusive and that other steps may be included or one or more steps in the flowchart may be deleted without affecting the scope of rights.

The claims set forth herein may be combined in various ways. For example, the technical features of the method claims of this specification may be combined to implement a device, and the technical features of the device claims of this specification may be combined to implement a method. Additionally, the technical features of the method claims of this specification and the technical features of the device claims may be combined to implement a device, and the technical features of the method claims of this specification and technical features of the device claims may be combined to implement a method.

What is claimed is:

1. An operation method of user equipment (UE), comprising:
    if the UE is using an Evolved Packet System (EPS) service with control plane Cellular Internet of Things (CIoT) EPS optimization with overhead reduction, generating an EPS Mobility Management (EMM) transport message,
    wherein the EMM transport message includes a protocol discriminator, a security header type, a message authentication code and a sequence number,
    wherein if the EMM transport message is sent in an EMM data transport procedure or if the EMM transport message is sent in a service request procedure for UE using the EPS service with control plane CIOT EPS optimization with overhead reduction to send a user data, a short message service (SMS) message or a location service (LCS) message, the EMM transport message further includes a data container,
    wherein if the data container is included in the EMM transport message, the EMM transport message is transmitted partially ciphered by using a ciphering algorithm,
    wherein input parameters to the ciphering algorithm includes a length of a key stream to be generated by an encryption algorithm, and
    wherein for the EMM transport message, the length of the key stream is set to a length of a portion of the EMM transport message starting with octet 7 until an end of the EMM transport message.

2. The method of claim 1, further comprising:
    transmitting the EMM transport message as integrity protected.

3. The method of claim 1, wherein the data container is deciphered using a ciphering algorithm of a current EPS security context.

4. The method of claim 1, wherein the data container contains a data payload and control information associated with the data payload.

5. A user equipment (UE), the UE comprising:
    at least one processor; and at least one computer memory operably connectable to the at least one processor and storing instructions that, when executed by the at least one processor, perform operations comprising:

if the UE is using an Evolved Packet System (EPS) service with control plane Cellular Internet of Things (CIoT) EPS optimization with overhead reduction, generating an EPS Mobility Management (EMM) transport message, wherein the EMM transport message includes a protocol discriminator, a security header type, a message authentication code and a sequence number, wherein if the EMM transport message is sent in an EMM data transport procedure or if the EMM transport message is sent in a service request procedure for UE using the EPS service with control plane CIOT EPS optimization with overhead reduction to send a user data, a short message service (SMS) message or a location service (LCS) message, the EMM transport message further includes a data container, wherein if the data container is included in the EMM transport message, the EMM transport message is transmitted partially ciphered by using a ciphering algorithm, wherein input parameters to the ciphering algorithm includes a length of a key stream to be generated by an encryption algorithm, and wherein for the EMM transport message, the length of the key stream is set to a length of a portion of the EMM transport message starting with octet 7 until an end of the EMM transport message.

6. The UE of claim 5, wherein the operations further include:

transmitting the EMM transport message as integrity protected.

7. The UE of claim 5, wherein the data container is deciphered using a ciphering algorithm of a current EPS security context.

8. The UE of claim 5, wherein the data container contains a data payload and control information associated with the data payload.

9. A semiconductor chipset for a user equipment (UE), comprising:

at least one processor; and at least one memory capable of storing instructions and being connected electrically to the at least one processor operably, wherein operations, performed when the instructions are executed by the at least one processor, includes:

if the UE is using an Evolved Packet System (EPS) service with control plane Cellular Internet of Things (CIoT) EPS optimization with overhead reduction, generating an EPS Mobility Management (EMM) transport message, wherein the EMM transport message includes a protocol discriminator, a security header type, a message authentication code and a sequence number, wherein if the EMM transport message is sent in an EMM data transport procedure or if the EMM transport message is sent in a service request procedure for UE using the EPS service with control plane CIOT EPS optimization with overhead reduction to send a user data, a short message service (SMS) message or a location service (LCS) message, the EMM transport message further includes a data container, wherein if the data container is included in the EMM transport message, the EMM transport message is transmitted partially ciphered by using a ciphering algorithm, wherein input parameters to the ciphering algorithm includes a length of a key stream to be generated by an encryption algorithm, and wherein for the EMM transport message, the length of the key stream is set to a length of a portion of the EMM transport message starting with octet 7 until an end of the EMM transport message.

10. The semiconductor chipset of claim 9, wherein the operations further include:

transmitting the EMM transport message as integrity protected.

11. The semiconductor chipset of claim 9, wherein the data container is deciphered using a ciphering algorithm of a current EPS security context.

12. The semiconductor chipset of claim 9, wherein the data container contains a data payload and control information associated with the data payload.

* * * * *